United States Patent Office.

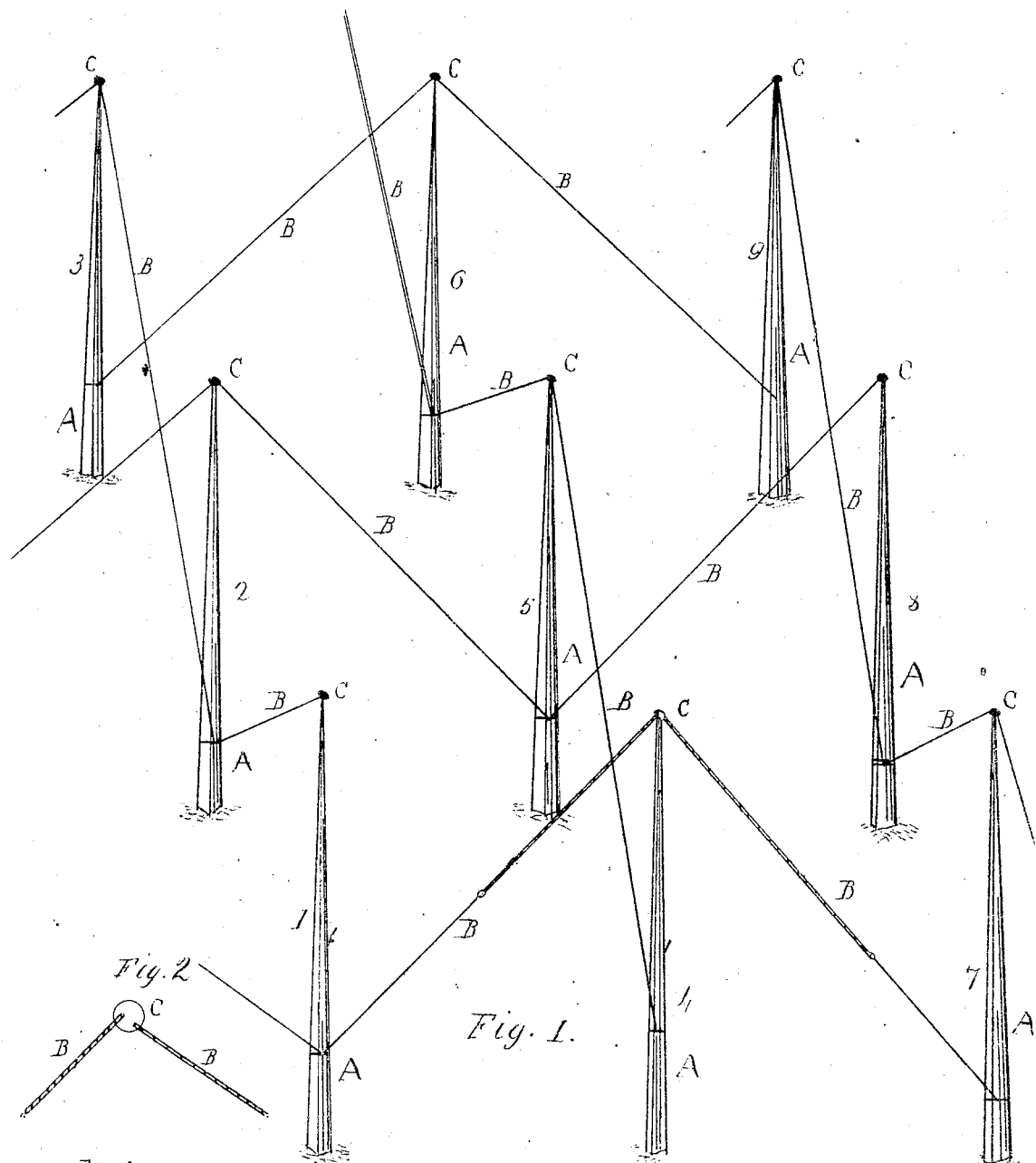

GARRET J. OLENDORF AND ALBERT O. PARSHALL, OF MIDDLEFIELD, NEW YORK.

Letters Patent No. 73,750, dated January 28, 1868.

IMPROVEMENT IN POLING HOPS.

*The Schedule referred to in these Letters Patent and making part of the same.*

TO ALL WHOM IT MAY CONCERN:

Be it known that we, GARRET J. OLENDORF and ALBERT O. PARSHALL, of the town of Middlefield, county of Otsego, in the State of New York, have invented a new and improved Mode of Poling Hops; and we do hereby declare that the following is a full and exact description thereof, reference being had to the accompanying drawings, and to the letters of reference marked thereon, in which—

Figure 1 is a perspective view of the hop-yard, and

Figure 2 a sectional view of the ring and cords.

Same letters of reference refer to the same part on each of the figures.

The nature of our invention consists in using but one pole to each hill of hops, and twine or cords running from each of said poles, at the distance of about five feet from the earth, in different directions, to the tops of the next poles, in such a manner as will brace said poles, and will distribute the vines more evenly through the yard, giving a better chance for the sun and air to circulate amongst them than any other method, and also in having a ring or its equivalent on the top of each pole, which we slip off, and hang on a hook or nail, at a convenient height for picking the hops without cutting the vines.

A A, &c., are the poles, of the ordinary length, say from ten to fourteen feet long, the tops of which are prepared for a ring to go on them, either by cutting to the proper size, or by driving a nail or its equivalent into the top of said poles, which we set, one in each hill of hops. B B, &c., is the twine or cord. C C, &c., are rings, or their equivalents, tied in the cord, to slip on to the tops of the poles. We propose, as the best way, to have two pieces of strong twine, each about seven feet long, tied to each ring, which will last for a number of years, and use small twine to connect the strong twine to the poles, which may be cut when the vines are stripped off; but, if preferred, the strong twine may be of sufficient length to reach and tie to the pole, or small twine may be used for the whole, or rods or small poles may be used instead of twine; and a noose in the twine may be substituted for the rings, or a notch might be cut in the top of each pole for the twine to rest in.

We are aware that a number of different methods of arranging twine in connection with poles and stakes, &c., have been patented, but our method or manner of arranging them is entirely different from anything that we know of. We run four vines up each pole about five feet, to where the twine is connected to the pole; then we run two vines up each twine in opposite directions, thus: A, No. 1, the cords run to the tops of poles east and west; A, No. 2, to the tops of poles 1 and 3, north and south; and so they keep changing alternately through the yard. The cords which run to the top of a pole always go in a different direction to those running from the base, as is seen by referring to pole No. 5, the cords from the base running to the top of poles 8 and 2, east and west, while those running to the top of said pole No. 5 are from poles 4 and 6, north and south; so that there are no cords crossing each other to get entangled, or coming together in any way, except as they meet at the top of the poles.

What we claim as our invention, and desire to secure by Letters Patent, is—

The herein-described combination and arrangement of the poles A, cords B, and rings C, as and for the purpose set forth.

GARRET J. OLENDORF,
ALBERT O. PARSHALL.

Witnesses:
SAMUEL HARPER,
HIRAM TUTTLE.